(12) United States Patent
Tuckfield et al.

(10) Patent No.: US 11,068,477 B1
(45) Date of Patent: Jul. 20, 2021

(54) NATURAL LANGUAGE PROCESSING WITH PRE-SPECIFIED SQL QUERIES

(71) Applicant: GBT Travel Services UK Limited, London (GB)

(72) Inventors: Bradford Tuckfield, Austin, TX (US); Sreelakshmi Chilukuri, Arcadia, CA (US)

(73) Assignee: GBT TRAVEL SERVCES UK LIMITED, London (GB)

( * ) Notice: Subject to any disclaimer, the term of this patent is extended or adjusted under 35 U.S.C. 154(b) by 209 days.

(21) Appl. No.: 16/001,454

(22) Filed: Jun. 6, 2018

(51) Int. Cl.
G06F 16/242 (2019.01)
G06N 20/00 (2019.01)
G06F 16/248 (2019.01)
G06F 16/2452 (2019.01)

(52) U.S. Cl.
CPC .......... *G06F 16/243* (2019.01); *G06F 16/248* (2019.01); *G06F 16/2445* (2019.01); *G06F 16/24522* (2019.01); *G06N 20/00* (2019.01)

(58) Field of Classification Search
CPC ............ G06F 16/2428; G06F 16/2458; G06F 16/243; G06F 16/3338; G06F 16/24535; G06F 16/90335
See application file for complete search history.

(56) References Cited

U.S. PATENT DOCUMENTS

| | | | | |
|---|---|---|---|---|
| 5,574,908 A | * | 11/1996 | Harding | G06F 16/2423 |
| 5,584,024 A | * | 12/1996 | Shwartz | G06F 16/2423 |
| 6,714,939 B2 | * | 3/2004 | Saldanha | G06F 40/131 |
| 7,324,936 B2 | * | 1/2008 | Saldanha | G06F 40/30 704/9 |
| 7,702,508 B2 | * | 4/2010 | Bennett | G06F 40/20 704/257 |
| 8,838,659 B2 | * | 9/2014 | Tunstall-Pedoe | G06N 5/02 707/899 |
| 9,449,080 B1 | * | 9/2016 | Zhang | G06F 40/30 |
| 9,519,681 B2 | * | 12/2016 | Tunstall-Pedoe | G06N 5/022 |
| 2004/0172237 A1 | * | 9/2004 | Saldanha | G06F 40/14 704/4 |
| 2005/0080614 A1 | * | 4/2005 | Bennett | G06F 40/216 704/9 |
| 2005/0086046 A1 | * | 4/2005 | Bennett | G09B 5/04 704/2 |

(Continued)

FOREIGN PATENT DOCUMENTS

WO    WO2017/213682 A1  * 12/2017

OTHER PUBLICATIONS

Schilit et al., "Beyond Paper: Supporting Active Reading with Free Form Digital In Annotations", Proceeding of the SIGCHI Conference of Human Factors in Computing Systems. Jan. 1998.*

*Primary Examiner* — Daniel A Kuddus
(74) *Attorney, Agent, or Firm* — K&L Gates LLP

(57) ABSTRACT

A natural language processing system with pre-specified SQL queries is provided. A user input can be performed via a graphical user interface. The system can process via natural language processing, and return an intent field corresponding to one or more variables. Pre-specified SQL queries can be provided for possible intents. The query can be altered by populating with particular parameters. In addition, an answer can be returned to the user comprising natural language results and graphical material.

1 Claim, 10 Drawing Sheets

(56) References Cited

U.S. PATENT DOCUMENTS

| | | | | |
|---|---|---|---|---|
| 2008/0126080 | A1* | 5/2008 | Saldanha | G06F 40/143 704/9 |
| 2010/0005081 | A1* | 1/2010 | Bennett | G10L 15/30 704/9 |
| 2011/0320187 | A1* | 12/2011 | Motik | G06F 16/3329 704/9 |
| 2016/0034578 | A1* | 2/2016 | Wang | G06Q 40/08 707/722 |
| 2017/0235848 | A1* | 8/2017 | Van Dusen | G06F 16/904 705/12 |
| 2018/0075161 | A1* | 3/2018 | Saeed | G06F 16/9024 |
| 2018/0286401 | A1* | 10/2018 | Oh | G10L 15/063 |

\* cited by examiner

```
select MONTH(inv_dt) AS Closing_Month, SUM(htl_cost_usd_am) from gtdr_cdc.trav_hotel_fact
where inv_dt >= '2017-03-01' and inv_dt<='2017-10-31' AND
corp_id LIKE 'XYZ%' GROUP BY MONTH(inv_dt) SORT BY Closing_Month limit 15;
```

FIG. 4

```
{
  "id": "a90d1bb7-df0f-4e97-9ee6-f8ff4e152d1f",
  "timestamp": "2017-12-05T20:38:16.312Z",
  "lang": "en",
  "result": {
    "source": "agent",
    "resolvedQuery": "I want to know about flights booked offline by ABC Company from June to November 2017 on American Airlines.",
    "action": "",
    "actionIncomplete": false,
    "parameters": {
      "airline": "American Airlines",
      "client": "ABC Company",
      "onlineoffline": "offline",
      "when": "2017-06-01/2017-11-30"
    },
    "contexts": [],
    "metadata": {
      "intentId": "3a0a8634-14e8-45c4-8a5c-79e68941e8c0",
      "webhookUsed": "false",
      "webhookForSlotFillingUsed": "false",
      "intentName": "flight.spend"
    },
    "fulfillment": {
      "speech": "",
      "messages": [
        {
          "type": 0,
          "speech": ""
        }
      ]
    },
    "score": 1
  },
  "status": {
    "code": 200,
    "errorType": "success",
    "webhookTimedOut": false
  },
  "sessionId": "eb111eb1-f3a1-4679-9019-be4e618e5508"
}
```

FIG. 6

```
select MONTH(inv_dt) AS Closing_Month, SUM(air_fare_usd_am) AS Total_Amount from gtdr_cdc.trav_inv_fact where inv_dt >= '2017-06-01' and inv_dt<='2017-10-31' GROUP BY MONTH(inv_dt) SORT BY Closing_Month limit 15
```

FIG. 7

| The chatbot has parsed your input as follows | Correction: the chatbot should have parsed the input as follows |
|---|---|
| Intent: count of flights | Intent: (drop-down selection of all possible intents) |
| Start date: January 1, 2018 | Start date: (date selection tool) |
| End date: December 31, 2018 | End date: (date selection tool) |
| Entity: Microsoft | Entity: (text box for free-form input) |

FIG. 9

NATURAL LANGUAGE PROCESSING WITH PRE-SPECIFIED SQL QUERIES

BACKGROUND

Business intelligence tools that are customer-facing can be a significant value-added offering to gain and maintain customers. In addition, business intelligence tools that are business-facing—where the business itself is analyzing and acting on analytics—can be equally important. By facilitating efficient handling of business tasks, their results also flow down to the customer. Especially where business tasks are information-intensive, business intelligence—within, and for, the business—is a boon.

In the field of travel, events can move quickly, and have immediate and wide-reaching repercussions. Indeed, traveler safety can be affected by quick, responsive handling of the events. Intrabusiness intelligence tools can aid in addressing the above.

Accordingly, both improved business performance and traveler safety can be obtained by business intelligence mechanisms.

To implement such mechanisms, computer-facilitated business intelligence functionalities can be employed. One such functionality is natural language processing (NLP). There are many aspects to natural language processing (NLP). In a basic sense, a NLP approach takes as its input human language, be it text or speech, performs computations, and creates as an output an action based on "understanding" the human language input. Tailored to the travel field, a natural language processing "chatbot" can promote business performance and traveler safety.

DRAWINGS

FIG. 4 is an example of code illustrating a report for hotels based on a pre-specified SQL query.

FIG. 6 is an example of code illustrating obtaining data that is returned by a natural language processing API.

FIG. 7 is an example of code illustrating a report for flight bookings based on a pre-specified SQL query.

FIG. 9 is an example embodiment for implementing chatbot machine learning by directly utilizing user feedback based on a pre-specified SQL query.

SUMMARY OF THE INVENTION

In embodiments are presented a system and computer-implemented method for a natural language processing system with pre-specified SQL queries.

DETAILED DESCRIPTION

Reference will now be made in detail to several non-limiting embodiments, including embodiments showing example implementations. The figures depict example embodiments of the disclosed systems, and/or methods of use for purposes of illustration only. One skilled in the art will readily recognize from the following description that alternative example embodiments of the systems and methods illustrated herein may be employed without departing from the principles described herein.

Figure 1:
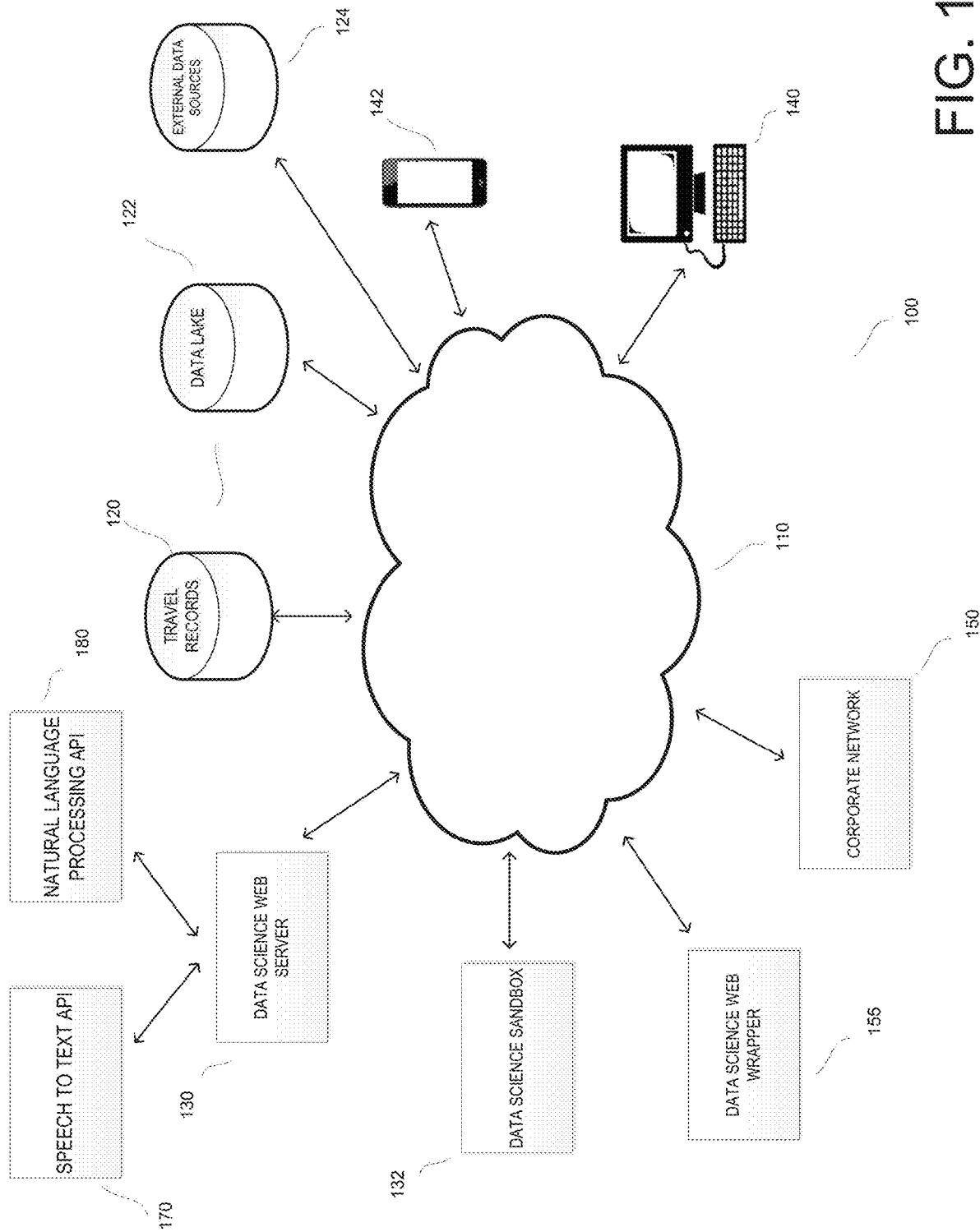
FIG. 1 illustrates one embodiment of an architecture and computing environment for a natural language processing system with pre-specified SQL queries.

FIG. 1 can illustrate a non-limiting example of a computing environment 100 for a natural language processing system with pre-specified SQL queries. Data science web server 130, which can be logically and/or physically associated with one or more servers and/or processors, can be operatively associated with a travel record database 120 and data lake 122, as well as with external data sources 124, as by a network 110.

It will be appreciated that, in an embodiment, SQL can be used. However, in embodiments additional or other query languages can be used and the system can obtain identical or similar results. A query language can be considered a language, routine, code or the like that can interrogate a database and return results.

Network 110 can represent a network of any logical or physical size such as a broad network such as the Internet, and can represent a small one such as a LAN or hyperlocal network, it being understood that a network enables communication of data from one computing device to another. Data science web server 130 can be operatively associated with a computer(s), input device(s) and display(s) 140, 142. Computer, input device and display(s) 140, 142 (wherein the foregoing can be singular or plural) can contain or be operatively associated with a processor(s), and with memory (ies) and can include software applications. Computer, input device and display 140, 142 can comprise a personal computer, a laptop, a tablet, a mobile device such as a smart phone, smart glasses, or a smart watch; it will be appreciated that any device containing, or in operative association with, a processor(s) and a memory(ies), can serve the purpose of computer and input device(s) 140, 142. As noted, data science web server 130 can be in operative communication with a network 110. Network 110 can permit operative communication of the foregoing functionalities with added devices, functionalities and modules.

Data science sandbox 132, which can be logically and/or physically associated with one or more servers and/or processors, can comprise and/or be in operative communication with computational functionality to implement an architecture for carrying out the system and method herein. The capabilities thereof can be implemented as suitable by one or more of software, firmware, and hardware.

Data science web wrapper 155 can be in operative communication with network 110. Data science web wrapper 155 can perform functions such as facilitating conversion from one information format to another. Reverse proxy mechanisms can intermediate between data science web wrapper 155 and data science web server 130. And, data science web server 130 can be bridged with data science sandbox 132 by a mechanism such as Flask.

In embodiments, the chatbot can be set up on a web server that runs Windows. This server can run the software Internet Information Services (IIS). This software calls for a web wrapper to manage the interaction between the front-end and the back-end. The web wrapper can use "Application Request Routing" to do reverse proxying that handles requests for the site's back end.

Regularly scheduled ETLs can intermediate between data science sandbox 132 and travel records 120, data lake 122, and external data sources 124.

Data science web server 130 can further be in operative communication with a speech-to-text API 170. Data science web server 130 can further be in operative communication with a natural language processing API 180.

It is understood that some or all of the foregoing functionalities can be in operative communication via one or more communications networks, wired or wireless. Each of the foregoing functionalities can be controlled by mechanism of software or firmware instructions embodied in a non-transitory computer medium.

Figure 2:
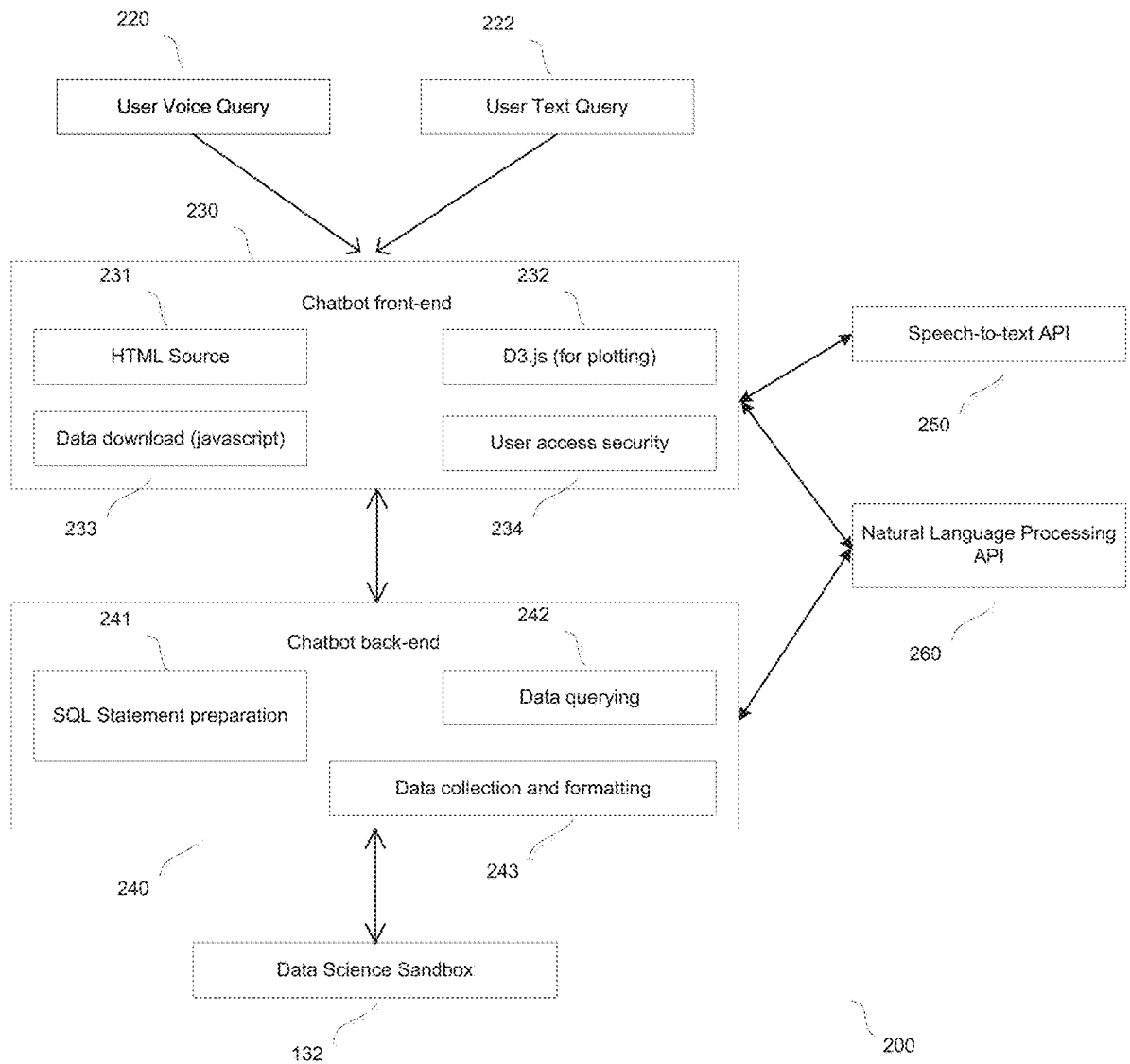
FIG. 2 illustrates one embodiment of a functional flowchart of a natural language processing system with pre-specified SQL queries.

FIG. 2 shows an embodiment of a functional flowchart for a natural language processing system with pre-specified SQL queries. It will be appreciated that a query can be pre-specified, and then populated with data afterwards.

A user voice query 220, such as voice commands through a microphone, or a user text query 222, can be transmitted to a chatbot front-end 231. Audio from a voice command can be sent to a speech-to-text API 250 (which can be externally managed), such as speech-to-text API 170. The speech-to-text API 250 converts the audio file to plain text and sends the plain text results back to the chatbot. After receiving plain text, the chatbot processes the query as it would a user text query. A natural language processing API 260 can be provided.

Chatbot front-end 230 can comprise or be in operative communication with modules including but not limited to an HTML source 231, D3.js 232 (for plotting), data download (JavaScript) 233 and user access security 234.

In turn, chatbot front-end 230 can be in operative communication with a chatbot back-end 240. Chatbot back-end 240 can comprise or be in operative communication with modules including but not limited to SQL statement preparation 241, data querying 242, and data collection and formatting 243.

The foregoing can be in operative communication with a data science sandbox, such as data science sandbox 132, or another data science sandbox.

Figure 3:
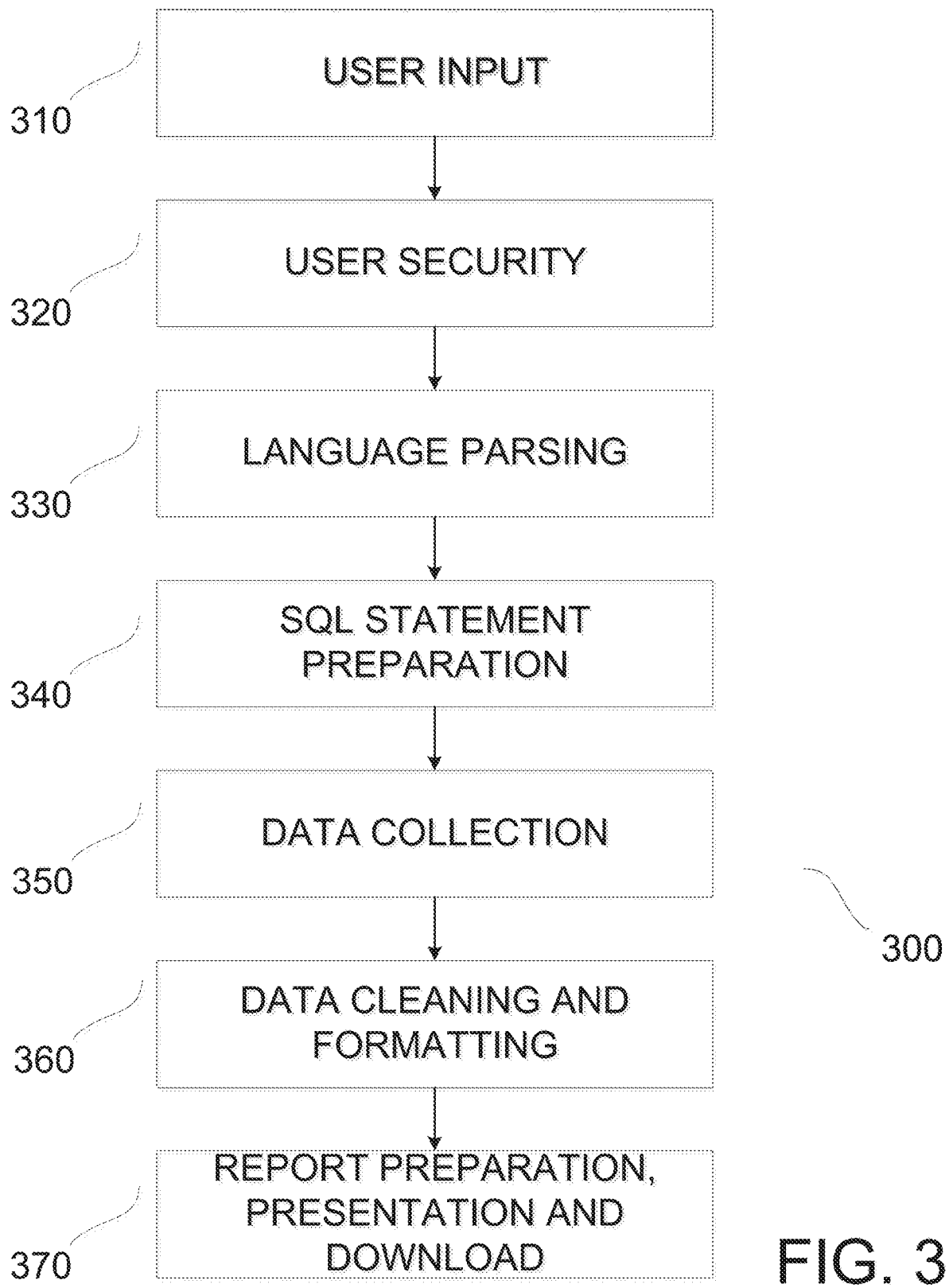
FIG. 3 is an example flow for a natural language processing system with pre-specified SQL queries.

Accordingly, in an embodiment, as shown in FIG. 3, a flow 300 is provided by which to perform natural language processing with pre-specified SQL queries. User input can be obtained 310. Such user input can for example be voice or text. User access security is of course important. The security can be implemented with a token-based authentication system. Thus, user security, such as access controls, can thereupon be verified 320. For example, User 1 may be authorized to access a full range of information including number of flights taken, or hotels booked, without significant or any limitation on permissions granted. In contrast, User 2 may be limited to a predetermined access level with a narrower subset of information. Such access controls may be based on employee title, employee department, pre-registration, and many more mechanisms for access control differentiation.

Language parsing can be implemented 330. Text input can be sent to a natural language processing API. This API can parse the human language of the text and return pre-specified results back to the chatbot. The results that are returned by the natural language processing API can contain the following parameters, among others:

An "intent". The natural language processing API can determine the "intent" or in other words the "gist" of a natural language query. The intents can be pre-specified and examples can be provided to the natural language processing software. Possible intents can include:

Count of flights.
Count of hotel bookings.
Total spending. This could mean spending by an individual or a corporation. It could be total spending on flights, hotels, or car rentals.
Personal habits. Users can query about individual travelers and their travel habits, including where they most frequently travel, what vendors they most frequently hire, and how much they tend to spend and when.
Dates. For example, a user can query for travel spending between February and October of a particular year.
Locations. For example, a user can query for travel spending on flights from Newark International Airport.
Corporations. For example, a user can query for travel spending on behalf of Cisco, Inc.
Vendors. For example, a user can query for travel spending on flights operated by American Airlines.
Individuals. For example, a user can query for travel spending by a given individual.
Booking channel. For example, a user can query for travel spending only via offline bookings.

The "intents" returned in language parsing step 330 can have one or more corresponding pre-prepared SQL statements 340. These statements can be stored as strings. The strings can be populated with other data returned in language parsing step 330.

FIG. 4 shows an example SQL statement preparation process. In this case, it illustrates a report based on a pre-specified SQL query for hotel usage for XYZ Company for a predetermined period. It will be seen that this query is limited to a specific company, here XYZ.

After populating the SQL statements, data collection 350 can occur. These prepared statements can be used to query tables in the data science sandbox. Since the data science sandbox can be located apart from the web server that hosts the chatbot, these queries can be sent over a bridge created from Flask.

The backend of the chatbot can perform data cleaning and formatting 360 for report generation and data plotting. Queries that cover time periods longer than one month can be aggregated at the monthly level. Queries that cover time periods that are shorter than one month can be aggregated at the daily level. Duplicate records can be eliminated.

In addition, data that has been collected and formatted can be made available for download in comma-separated (csv) format 370. The aggregated data (at the daily or monthly level) can be plotted on the front-end of the chatbot using D3.js technology or another mechanism. Key features of the data can be compiled into a pdf file, or a file of another format, that is downloadable as a report.

Figure 5:
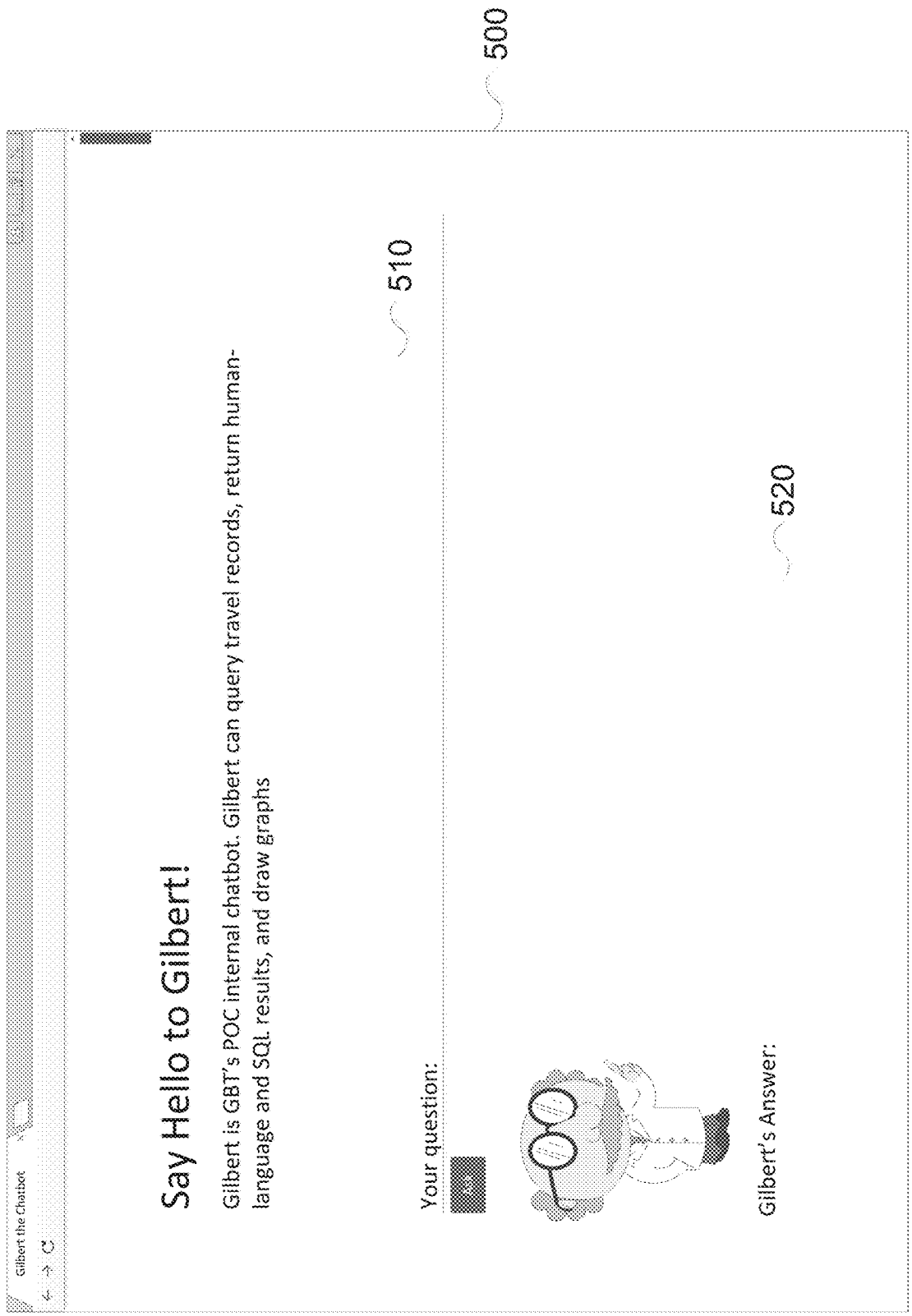
FIG. 5 is an example front end of a chatbot.

An example scenario is now discussed. In this scenario, flights can be counted. A chatbot can be accessed internally from within the corporate network. As shown in FIG. 5, there can be a graphical user interface embodied on a screen 500. The GUI can enable a user to ask a question 510, which can be query travel records and whereby the answer 520 can be provided, which can embody human-language and SQL results and/or draw graphs. The user can enter a question in English. In embodiments, the system can return an answer in English, and the SQL code or other query language code that can be used to get the answer to the question. Further, the system can return a plot or other graphical representation of the resulting data. In addition, the system can return an option to download or otherwise obtain access to relevant data. Accordingly, code can displayed in the result, since the user might find it useful to consult the SQL query that can help answer or otherwise address the question later when the user is not using the system in the aforementioned manner.

In the text box 510 labeled "Your question", the user can type a natural language query in a language for which functionality is provided, here English. For example, the question can be "I want to know about flights booked offline by ABC Company from June to November 2017 on American Airlines." The back-end of the chatbot can send this text to an external natural language processing API.

FIG. 6 shows an example of data (in JSON format) that is returned by the API. The API has returned an "intent-Name" equal to "flight.spend" 610. It will be appreciated that the back-end of the chatbot stores pre-specified SQL queries corresponding to possible intent.

FIG. 7 shows a pre-specified SQL query for flight bookings for a predetermined period. This particular query is not limited to a specific company.

A query can be altered by populating it with particular parameters that are returned from the natural language processing API. For example, the data parameters can be replaced by dates in the "when" parameter returned by the API. The system can provide a SELECT [ . . . ] FROM a table WHERE DATE>DATE1 and DATE<DATE2. Then, using the dates data returned from the natural language API, the system can do a replacement operation where "DATE1" is replaced by a variable such as "2017-01-01" and "DATE2" is replaced by "2017-12-31". In order to convey the concept, the foregoing may not bear an identical relation to actual code, but can be more in the nature of pseudocode. Actual query language code used, including SQL programming code, can vary.

The query can then be used to return data from tables stored in a data science sandbox. The data returned from the sandbox can then be cleaned and formatted by the back-end of the chatbot.

Further, the results can be presented in one or more of the following formats:

A plot of monthly totals presented on a graphical user interface such as a web page.

A downloadable comma-separated data file.

A pdf containing key metrics related to the data.

Additional embodiments are available. For example, the chatbot is capable of answering a variety of different user questions. The following are examples of natural language questions that can be parsed and answered by the chatbot:

How much did John Smith spend on flights in April 2017?

How many Hilton hotels were booked by employees from the corporation ABCD in the last 5 years?

What airports does John Smith most frequently fly to?

What were the most common routes flown by American Airlines between the US and Canada in 2017?

The externally managed natural language processing API, in order to parse "intents" and parameters from the natural language queries entered by users, can be provided with examples of queries for each kind of intent. In practice, this means that many synonymous queries can be entered into the natural language processing API and labeled according to the intended "intent" and the corresponding parameters.

The system can be trained by machine learning techniques, e.g., by presenting the system with a set of data with selected known or presumed-known parameters and training the system to improve accuracy in determining an intent when presented with new data.

For example, the natural language processing API could be given each of the following queries and "trained" to know that all correspond to the "intent" called "flight.count":

Please tell me the number of flights taken between January and June of last year.

What was the count of all flights from January to June of 2017?—Between 01-2017 and 06-2017, how many flights were taken by all employees?

Count all flights that were taken in first six months of last year and tell me the results.

Thus, it can be appreciated that a natural language processing step returns two things that are important. First, it returns an "intent". Two examples of intents are "flight.spend" and "hotel.spend". The intent that is returned can determine which type of pre-specified SQL query to use. The natural language processing step can also return a set of parameters. For example, if the system has found a date in the English-language query, it returns that date in a machine-readable format. For example, it can return "2017-01-01" from the query "since the beginning of 2017". If it doesn't find a date in the original query, it can return NULL. Accordingly, in embodiments different operations can occur depending on what the intent is and which parameters are returned. There can be separate SQL queries for each of the following scenarios (among others): for "flight.spend intent with no dates" and "flight.spend intent with date 2017-01-01" and "hotel.spend intent with no dates" and "hotel.spend intent with date 2017-01-01".

Chatbot development can follow certain steps which include the following: The chatbot's back end is trained, e.g., to recognize intents and properly respond. The production version can be deployed with changes made from the prior training step. An end user or users can interact with the chatbot. As appropriate, end users can provide feedback to a developer, such as feedback on the accuracy of results, problems with the chatbot or ways to improve it. The system can be modified such as by a developer to incorporate user feedback from the prior step. The process can be repeated with new training implemented at the back end.

Figure 8:
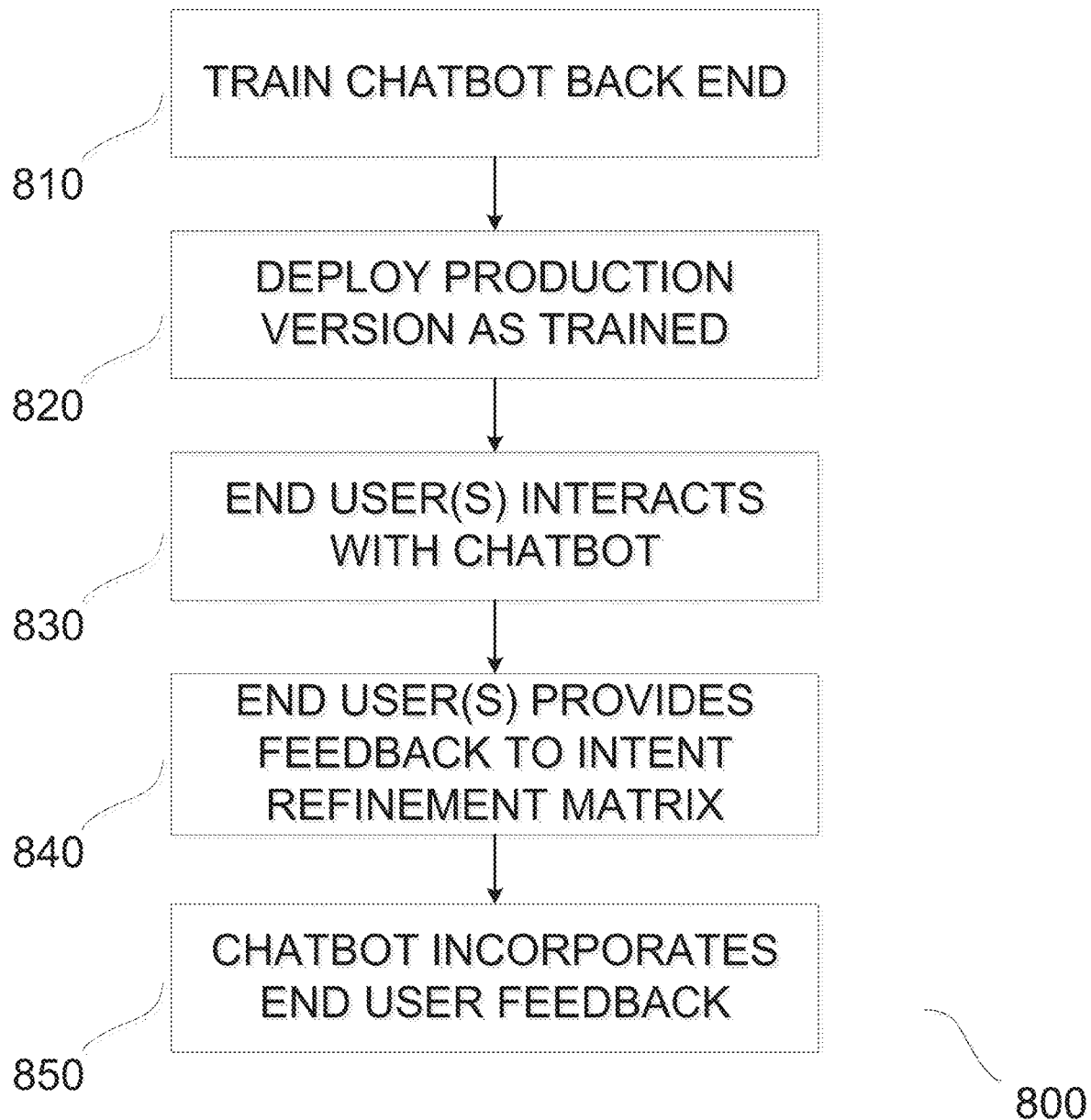
FIG. 8 is an example improved chatbot development process to yield a more efficient and accurate chatbot based on a pre-specified SQL query.

As seen in FIG. 8, an improved chatbot development process can, without developer intervention, yield a more efficient and accurate chatbot. This process involves steps similar to those in the foregoing paragraph. That is, the chatbot's back end is trained 810, e.g., to recognize intents and properly respond. The production version can be deployed with changes made 820 from the prior training step. An end user or users can interact with the chatbot 830. In an embodiment, the end user(s) can provide feedback directly to a chatbot intent refinement matrix 840. The feedback can include feedback on the accuracy of results, problems with the chatbot or ways to improve it. The chatbot can immediately and automatically incorporate feedback into the training process for its back end, without intervention from a developer 850, and can return to step 810 for further single or multiple iterations. It will be understood that the matrix can be in tabular form such as with one or more rows or columns, or can take another form in which the relevant fields are configured with relationships among each other. Such relationship can take the form of pairing an initial intent perceived by the system with a menu of one or more proposed refinements to return back to the system.

FIG. 9 shows an embodiment that implements chatbot machine learning by directly utilizing user feedback. The chatbot can return an intent refinement matrix 900 to the user that provides a column indicating how the chatbot has parsed the user input 910, and available mechanisms for the user to correct or otherwise modify the intent 920. For example, the chatbot can indicate that it perceives that the user has provided an intent: count of flights 930. Paired with this, the user can be provided a drop-down menu showing alternate user intents 940 that are perhaps more accurate. "More accurate" means objectively or subjectively more accurate as considered by the user, or otherwise to be provided to enhance machine learning capabilities. In addition, the chatbot can indicate, for example, that it perceives that the user has provided a Start date of Jan. 1, 2018 932. The user can be provided a date selection tool 942 to refine user intent. The date selection can take the form of a rendering of an electronic calendar, a date entry field, or other mechanism. In addition, the chatbot can indicate, for example, that it perceives that the user has provided an End date: Dec. 31, 2018 934. The user can also be provided a drop-down menu showing an alternate end date 944 as by a date selection tool. Further, the chatbot can indicate that it perceives that the user has provided an Entity: Microsoft 936. The user can also be provided a text box whereby free-form input can be made 946. Upon receiving user input from one or more of the fields 940, 942, 944, 946 in the "should have parsed as" column 920, the system can refine its understanding of user input. The refinements can manifest as further and/or more accurate intelligence for this user and/or for added users.

Figure 10:
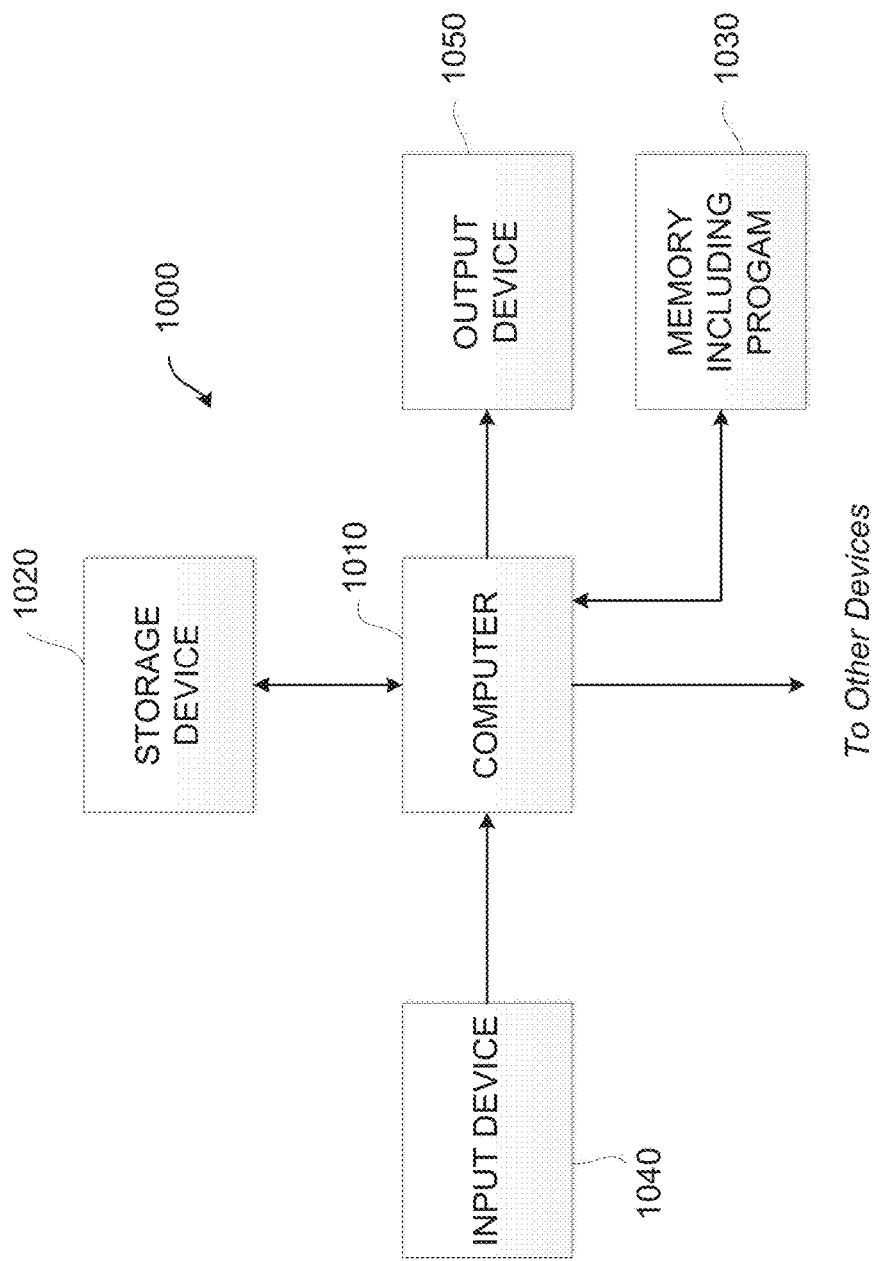
FIG. 10 illustrates an example functional architecture for a system and method for a natural language processing system with pre-specified SQL queries.

FIG. 10 illustrates a computer system 1000 for a system for natural language processing using pre-specified SQL queries. Computer 1010 may contain or be operatively associated with a processor(s), and with memory(ies) including storage device 1020 and memory 1030, which also may include software applications. An input device 1040, such as a keyboard or screen, can be used to enter inputs into, and exercises control of, computer 1010 and components associated therewith. There may be multiple computers operatively associated with computer 1010 and its associated components. There may be an output device 1050 such as a monitor screen, computer-to-computer communication device (e.g., modem), and/or a printer. In an embodiment, non-transitory computer readable media or memory 1030 are provided. The computer-readable media or memory can tangibly embody a program of instructions executable by the computer system to carry out operations as described herein.

While various details have been set forth in the foregoing description, it will be appreciated that the various aspects may be practiced without these specific details. For example, for conciseness and clarity selected aspects may have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Reference to "one aspect," "an aspect," "one embodiment," or "an embodiment" means that a particular method, feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular methods, features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described methods, systems, components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "in operative communication", "operably connected," or the like to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the claims, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

With respect to the claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments. The claims are intended to cover all such modifications and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated.

What is claimed is:

1. A system for natural language processing having an intent-refinement graphical user interface using a pre-specified database query, the system comprising at least one hardware processor, and a memory storing computer program instructions which when executed by the at least one hardware processor cause the at least one hardware processor to perform operations comprising:

training the system, by a machine learning technique, to identify a user intent relating to a business travel query, the user intent corresponding to a flight count, a hotel booking count, a total spending amount by an individual or corporation, a personal habit of an employee traveling for business, a date restriction of the business travel query, a location where the employee has traveled for business, a corporation for whom the business traveler has traveled for business, an airline carrier or hotel operator providing business travel services, or whether a business travel booking is made online or offline, resulting in a first trained system state;

displaying a text box configured to accept free-form text input typed in by the user;

receiving from the user the free-form text input in the free form natural language form;

determining, by the system a first perceived user intent, the first perceived user intent solely based on the free-form text input, and not based on the user's selecting a predefined intent displayed on the display;

displaying to the user, by a table associated with the graphical user interface, first results associated with a first perceived user intent in connection with business travel based on interpreting the first input, wherein the first results comprise:

a first column of the table displaying at least one interpretation by the system of perceived user intent based on the free-form text input typed by the user; and a second column of the table displaying a user-selectable graphical element, wherein the second column has a selectable element comprising a drop-down menu, wherein the selectable element is configured to provide options for user refinement of the at least one interpretation by the system of perceived user intent;

receiving from the user second input, based on a user selection of the user-selectable graphical element in the second column of the table, corresponding to a refinement of the perceived user intent; and incorporating into the system the refinement, resulting in a second trained system state.

* * * * *